United States Patent [19]

Kitamura et al.

[11] 4,247,041
[45] Jan. 27, 1981

[54] THERMALLY RESPONSIVE VALVE DEVICE

[75] Inventors: Kazuhiko Kitamura; Atsushi Satomoto, both of Toyota, Japan

[73] Assignee: Aisin Seiki Kabushiki Kaisha, Kariya, Japan

[21] Appl. No.: 136,861

[22] Filed: Apr. 3, 1980

Related U.S. Application Data

[63] Continuation of Ser. No. 965,209, Nov. 30, 1978, abandoned.

[30] Foreign Application Priority Data

Dec. 7, 1977 [JP] Japan .................. 52-164026

[51] Int. Cl.³ .................................. G05D 23/10
[52] U.S. Cl. ................................ 236/48 R; 236/87; 236/101 B; 236/101 C
[58] Field of Search ........... 236/101 B, 101 C, 101 A, 236/48 R, 87; 123/117 A; 137/625.48

[56] References Cited

U.S. PATENT DOCUMENTS

| | | | |
|---|---|---|---|
| 3,972,472 | 8/1976 | Kawabata | 236/87 |
| 4,026,464 | 5/1977 | Doherty, Jr. | 236/48 R |
| 4,076,172 | 2/1978 | Inada et al. | 236/48 R |
| 4,117,976 | 10/1978 | Doherty, Jr. | 236/48 R |
| 4,135,487 | 1/1979 | Hays | 126/110 R |
| 4,144,998 | 3/1979 | Wakabayashi et al. | 236/48 R |

*Primary Examiner*—William E. Tapolcai, Jr.
*Attorney, Agent, or Firm*—Sughrue, Rothwell, Mion, Zinn & Macpeak

[57] ABSTRACT

A thermally responsive valve device comprises a body member having an inlet port and outlet ports, a first passage communication between the inlet port and one of the outlet ports, a second passage communication between the inlet port and the other of the outlet ports, a valve seat positioned in the both passages, a valve means movable into and out of engagement with the valve seat, a bimetal disc movable in response to variations in temperature to close and open the first passage and second passage simultaneously.

4 Claims, 2 Drawing Figures

THERMALLY RESPONSIVE VALVE DEVICE

This is a continuation of application Ser. No. 965,209, filed Nov. 30, 1978 and now abandoned.

BACKGROUND OF THE INVENTION

1. Field of the Invention

This invention relates to thermally responsive valve devices, and more particularly to a thermally responsive valve device having an operating valve function which closes and opens two passages simultaneously or at the same time.

2. Prior Art

Various thermally responsive valve devices of this type have been used in emission control systems of automobiles. For example, a valve device of the wax operating type has been previously proposed. However, wax operating valves are commonly subject to a loss of wax when subjected to overpressures, and such loss of wax tends to change the operating temperature of the valve. Wax operating valves have a complicated structure and a relatively high production cost.

On the other hand, a valve device of the bimetal operating type has also been proposed. However, since the bimetal operating valve device needs two valve member positioned in the two passages and respective valve seats, the valve device is complicated in structure and high in cost.

SUMMARY OF THE INVENTION

It is an object of this invention to provide a thermally responsive valve device having an operating valve function which closes and opens two passages, simultaneously. It is another object of this invention to provide a thermally responsive valve device employing one bimetal disc which may be actuated at a predetermined termperature level. It is a further object of this invention to provide a thermally responsive valve device which is compact in construction, low in cost, and reliable in operation. It is yet another object of this invention to provide a thermally responsive valve device which eliminates the conventional defects.

BRIEF DESCRIPTION OF THE DRAWINGS

Various other objects of this invention will become apparent from the following detailed description when considered in connection with the accompanying drawings in which.

DETAILED DESCRIPTION OF THE PREFERRED EMBODIMENT

Figure 1:
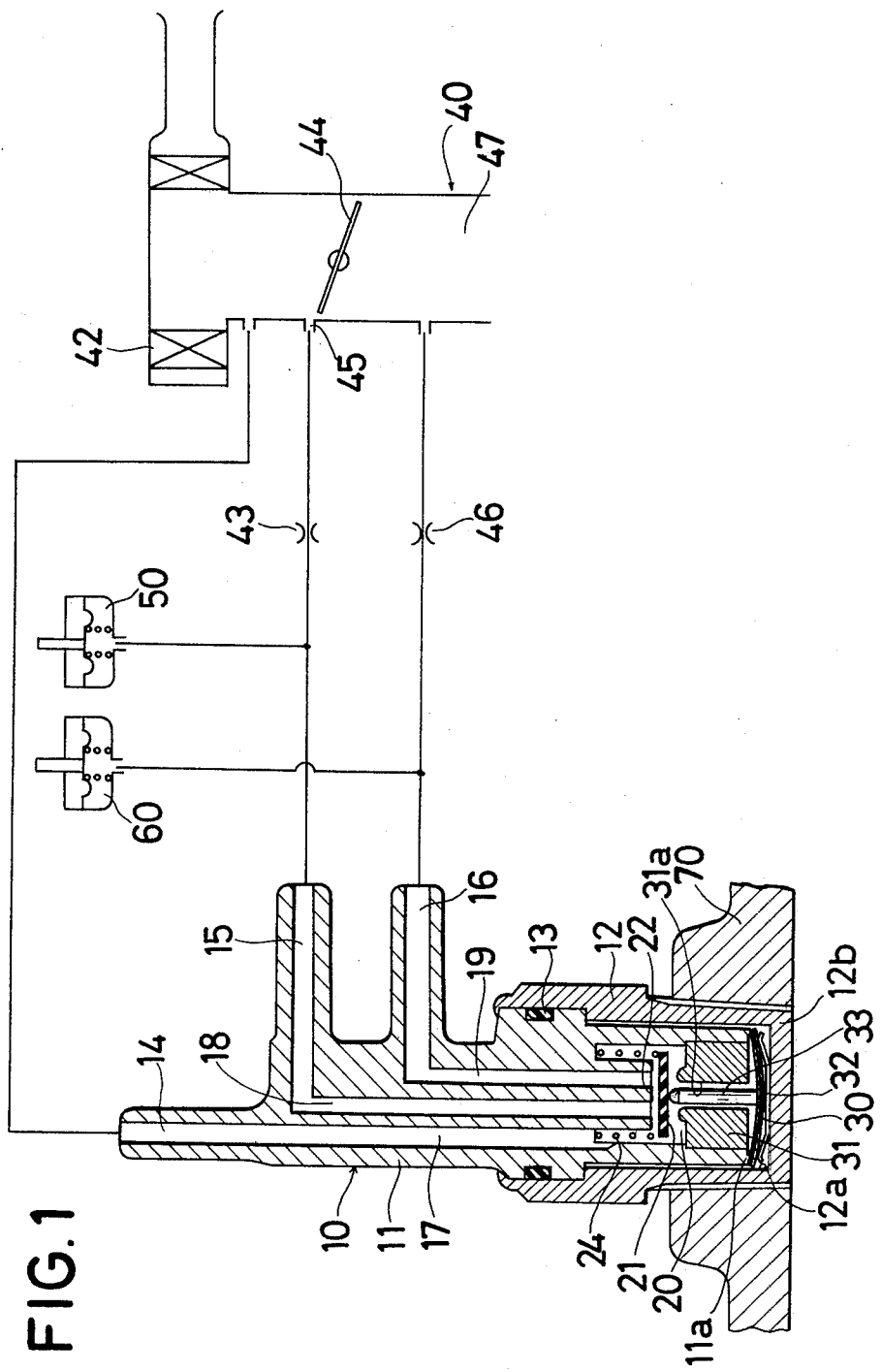
FIG. 1 is a vertical sectional view of a thermally responsive valve, in accordance with this invention, incorporated in an emission gas control system of an internal combustion engine.

Referring now to the drawings, a thermally responsive valve device 10 according to this invention includes a first body member 11 and a second body member 12, which are sealingly combined with each other by a suitable connecting means. A sealing O-ring or gasket 13 is disposed between the first and the second body members 11 and 12.

The first body member 11 has an inlet port 14, a first outlet port 15 and a second outlet port 16. The inlet port 14 is connected to an atmosphere source, such as the portion of the air intake passage between a throttle valve 44 of a carburetter 40 and an air cleaner 42.

A first vacuum responsive device 50 is connected through an orifice member 43 to a vacuum advance port 45 provided at a point just above the idle position of throttle valve 44.

A second vacuum responsive device 60 is connected through an orifice member 46 to an engine intake manifold 47. The first and second outlet ports 15 and 16 of the thermally responsive valve device 10 are connected to the first and second vacuum responsive device 50 and 60, respectively.

The first body member 11 is provided with a first passage 17, a second passage 18, and a third passage 19 communicating with the inlet port 14, the first outlet port 15, and the second outlet port 16, respectively. The second body member 12 is made of a thermally conductive metal material, and is positioned in the water jacket 70 adapted to cool the engine, thereby transferring the changes in coolant temperature within the water jacket to a bimetal disc 29 to be discussd below.

Formed inside of the first body member 11 is an operating chamber 20 communicating with the atmospheric source through the first passage 17 and the inlet port 14. A valve member 21, which is made of suitable elastic material such as rubber or synthetic resin, is located in the operating chamber 20 so as to be movable into and out of engagement with a valve seat 22 formed on the second and third passages 18 and 19 in the operating chamber 20. Interposed between the first body member 11 and the valve member is a coil spring 24 biasing the valve member 21 downwardly. Positioned within a central cavity 12a in the second body member 12 is a circular dish-shaped theremostatic bimetal disc 30 which is responsive to the changes in coolant temperature within the water jacket 70. The bimetal disc 30 has one layer of metal whose thermal coefficient of expansion is predetermined. As a result, the bimetal disc 30 may move by snap-action to the reverse dish-shape at a predetermined temperature. The first body member 11 has a circular shoulder 11a which extends toward the bimetal disc 30 and is of a diameter slightly smaller than the plane diameter of the disc 30 so that the outer margins of the disc 30 abut thereagainst as the disc 30 snaps over center.

A separator 31, which is made of thermal non-conductive material, is located in the hollow portion of the first body member 11. Therefore, the fluid in the operating chamber 20 is not influenced by change of temperature within the water jacket 70. The separator 31 has a through hole 31a which serves to maintain proper alignment of a transmitting pin 33. Interposed between the bimetal disc 30 and a flat bottom 12b of the second body member 12 is a wave-shaped annular spring 32 biasing the bimetal disc 30 upwardly, so that the transmitting pin 33 biases the valve member 21 toward the valve seat 22 when the coolant temperature in the water jacket 70 rises and reaches the predetermined level. As stated previously, the first vacuum responsive device 50 is supplied with the vacuum from the advance port 45 and operates in response to the change in the vacuum. Similarly, the second vacuum responsive device 60 is supplied with the manifold vacuum from the engine intake manifold 47, and operates in response to the changes in the vacuum.

Accordingly, the thermally responsive valve device 10 of this invention serves to supply the first and second devices 50 and 60 with atmospheric pressure in response to the changes within the coolant temperature and to control the operations of the first and second devices 50 and 60.

When the coolant temperature in the water jacket 70 is below the predetermined level, the bimetal disc 30 may move by snap-action to the reverse dish shape in a state as shown in FIG. 1. Accordingly, the valve member 21 is spaced from the valve seat 22, and the second passage 18 and the third passage 19 are in communication with the operating chamber 20. As a result, the atmospheric pressure is transmitted into both the second and third passages 18 and 19 from the first passage 17 at the same time, so that both the first and the second devices 50 and 60 are supplied with atmospheric pressure to prevent the operation of the devices.

Figure 2:
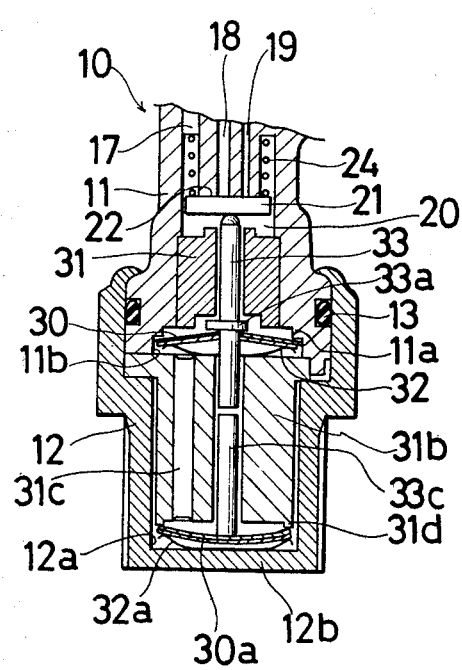
FIG. 2 is a diagrammatic view showing one stage of operation of a valve device according to another embodiment of this invention.

Referring next to FIG. 2 showing another embodiment in which same ports are shown by the same numbers.

Positioned within central cavities 11b and 12a in the first and second body members 11 and 12 are first and second circular dish-shaped thermostatic bimetal discs 30 and 30a which are responsive to the change in coolant temperature within the water jacket, respectively.

Each of the first and second bimetal discs 30 and 30a has one layer of metal whose thermal coefficient of expansion is low and another layer of metal whose thermal coefficient of expansion is somewhat higher. As a result, the bimetal discs 30 and 30a may move by snap-action to a reverse dish shape at first and second predetermined temperatures, respectively.

The metal materials of the two bimetal discs 30 and 30a are chosen such that the two dics perform their snap-action at different temperatures.

A spacer 31b is positioned between first and second body members 11 and 12. Interposed between the first bimetal disc 30 and an upper-portion of the spacer 31b is a first wave-shaped annular spring 32 biasing the first bimetal disc 30 upwardly, so that a first transmitting pin 33 having a flange portion 33a in engagement with disc 30 biases the valve member 21 toward the valve seat 22.

The spacer 31b has a circular shoulder 31d which extends towards the second bimetal disc 30a and is of a diameter slightly smaller than the plane diameter of the disc 30a so that the outer margins of the disc 30a abut thereagainst as the disc 30a snaps over center.

Interposed between the second bimetal disc 30a and a flat bottom 12b of the second body member 12 is a wave-shaped annular spring 32a biasing the second bimetal disc 30a upwardly. A transmitting pin 33c disposed between disc 30a and pin 33 transmits the force of disc 30a to bias the valve member 21 toward the valve seat 22.

In addition, the spacer 31b has a passage 31c which serves to communicate between cavities 11b and 12a, so that the atmospheric temperature of the cavities 11b and 12a is substantially equal to each other.

When the coolant temperature in the water jacket is below both first and second predetermined temperature levels, the first and the second bimetal discs 30 and 30a are in the state as shown in FIG. 2. Accordingly, the valve member 21 comes in contact with the valve seat 22. As a result, the second and third passages 18 and 19 are interrupted from the first passage 17.

When the coolant temperature rises and reaches the first predetermined temperature level, the first bimetal disc 30 moves with snap-action motion to the reverse dish shape. Accordingly, the valve member 21 is spaced from the valve seat 22, and the second and third passages 18 and 19 are in communication with the first passage 17. When the coolant temperature rises further and reaches the second predetermined temperature level, the second bimetal disc 30a moves with snap action to the reverse dish shape. Accordingly, again the valve member 21 comes in contact with the valve seat 22. As a result, the second and third passages 18 and 19 are interrupted from the first passage 17.

In view of the above, it will be seen that the several objects of the present invention are achieved and other advantages results attained.

Obviously, numerous modifications and variations of the present invention are possible in light of the above teachings. It is therefore to be understood that within the scope of the appended claims the invention may be practiced otherwise than as specifically described herein.

What is claimed is:

1. A thermally responsive valve device comprising body means having inlet port means and first and secnd outlet port means therein, chamber means in said body means in communication with said inlet port means, a valve seat comprising a surface disposed in said chamber means having first and second openings therein adjacent each other, first and second passage means connecting said first and second openings in said valve seat with said first and second outlet port means, respectively, valve means including a single valve member for controlling the opening and closing of said first and second openings in said valve seat simultaneously, spring means between said body and said valve member for biasing said valve member away from said seat to communicate said inlet port means with said first and second outlet port means at the same time and thermally responsive means operatively associated with said valve member to move said valve member to close said first and second openings at the same time in response to a predetermined temperature level.

2. A thermally responsive valve device as set forth in claim 1, wherein said thermally responsive means is comprised of a bimetallic disc means.

3. A thermally responsive valve device as set forth in claim 2, further comprising spring means positioned between said body means and said bimetallic disc means to bias said valve member toward said valve seat through said bimetallic disc means.

4. A thermally responsive valve device as set forth in claim 1, further comprising transmission means between said valve member and said disc means, said disc means being comprised of a first snap action bimetallic disc normally biasing said valve member through said transmission means to the closed position and operable at a first elevated temperature to allow said valve member to move to the open position and a second snap action bimetallic disc normally being out of operable engagement with said transmission means and operable at a second higher elevated temperature to bias said valve member through said transmission means to the closed position.

* * * * *